US 9,858,820 B2

(12) United States Patent
Huang et al.

(10) Patent No.: US 9,858,820 B2
(45) Date of Patent: Jan. 2, 2018

(54) TRANSPORTATION SERVICES PROVIDING METHOD AND USER DEVICE AND SERVER USING THE SAME

(71) Applicant: National Taipei University of Technology, Taipei (TW)

(72) Inventors: Shih-Chia Huang, Taipei (TW); Ming-Kai Jiau, Taipei (TW); Sheng-Kai Chou, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/946,786

(22) Filed: Nov. 20, 2015

(65) Prior Publication Data

US 2017/0061801 A1   Mar. 2, 2017

(30) Foreign Application Priority Data

Aug. 31, 2015   (TW) .............................. 104128587 A

(51) Int. Cl.
*G08G 1/00* (2006.01)
*G01C 21/34* (2006.01)
*G01C 21/36* (2006.01)

(52) U.S. Cl.
CPC ......... *G08G 1/202* (2013.01); *G01C 21/3423* (2013.01); *G01C 21/3438* (2013.01); *G01C 21/3605* (2013.01)

(58) Field of Classification Search
CPC .. G08G 1/202; G01C 21/3605; G01C 21/343; G01C 21/3438; G01C 21/3423
See application file for complete search history.

(56) References Cited

U.S. PATENT DOCUMENTS

2014/0156746 A1   6/2014  Wheatley
2016/0026936 A1*  1/2016  Richardson ............ G06Q 10/02
                                                       705/5

FOREIGN PATENT DOCUMENTS

| CN | 102202053 | 9/2011 |
| CN | 103944921 | 7/2014 |
| TW | 201404219 | 1/2014 |
| TW | 201428237 | 7/2014 |
| TW | I476727   | 3/2015 |

OTHER PUBLICATIONS

"Office Action of Taiwan Counterpart Application", dated Jun. 27, 2016, p. 1-p. 6.

* cited by examiner

*Primary Examiner* — Kimberly Berona
*Assistant Examiner* — Michael Kerrigan
(74) *Attorney, Agent, or Firm* — JCIPRNET

(57) ABSTRACT

A transportation services providing method and an user device and a server using the same are provided. The transportation services providing method includes following steps: providing a service platform connecting with at least one community website; collecting a status message, related to an event information and posted on the community website, so as to show the collected status messages on the service platform; obtaining an event location of the event information; and establishing a transportation service link on the status message, where the transportation service link provides a transportation service interface indicating the event location and a plurality of transportation requirement settings.

13 Claims, 5 Drawing Sheets

```
Destination: No.1, Sec. 1, Chengde Rd., Datong Dist.,
             Taipei City 103, Taiwan (R.O.C.)(VIESHOW CINEMA)

[Taxi service]  [Transportation planning]
```
TSI

FIG. 5

```
                    Taxi service
Destination: No.1, Sec. 1, Chengde Rd., Datong Dist.,
             Taipei City 103, Taiwan (R.O.C.)(VIESHOW CINEMA)

Ride time:   2015/7/15      17:30

Ride location: No.101, Sec. 2, Guangfu Rd.,
               Hsinchu City 300, Taiwan (R.O.C.)

Payment method:  ☐ cash      ☐ credit card carpool?         ☐ Agree     ☐ Disagree

[OK]  [Cancel]
```
TSIc

FIG. 6

TRANSPORTATION SERVICES PROVIDING METHOD AND USER DEVICE AND SERVER USING THE SAME

CROSS-REFERENCE TO RELATED APPLICATION

This application claims the priority benefit of Taiwan application serial no. 104128587, filed on Aug. 31, 2015. The entirety of the above-mentioned patent application is hereby incorporated by reference herein and made a part of this specification.

BACKGROUND OF THE INVENTION

Field of the Invention

The invention relates to a services providing method and applications thereof, and particularly relates to a transportation services providing method and a user device and a server using the same.

Description of Related Art

Along with the widespread of network, in today's society, to follow latest status of family and fiends and interact with family and friends through a community website and to learn latest news through information posted on the community website have become a rather popularised social and information obtaining method.

On a platform of a general community website, different community contacts, followed fan groups or artist status messages, etc., are displayed. A user may browse status messages such as check-in information, event participation information, etc. on the community website to learn, for example, restaurants where the community contacts have recently been, events that the community contacts have participated recently, and movies that the community contacts have enjoyed recently, or event information of a favorite artist such as when the artist has a concert, etc.

However, under a general usage situation, when the user discovers interested event information according to the status message of the community contact and wants to further participate, the user usually has to check an event location according to an event name or store information in the status message. After the event location is found, the user is further required to plan a transportation route to decide how to get the event site.

Moreover, the user probably uses a plurality of community websites of different types at a same time, and each of the community websites may have different status messages and event information. If the user does not constantly open and browse the community websites, the user is very likely to miss the interested event information. The above usage situation may cause usage inconvenience of the user, and may decrease an event participation willingness.

SUMMARY OF THE INVENTION

The invention is directed to a transportation services providing method and a user device and a server using the same, by which the problems mentioned in the related art are resolved.

The invention provides a transportation services providing method adapted to a user device or a server. The transportation services providing method includes following steps. A service platform connecting with at least one community website is provided. A status message related to an event information and posted on the community website is collected, and the collected status message is displayed on the service platform. An event location of the event information is obtained. A transportation service link is built on the status message, where the transportation service link provides a transportation service interface indicating the event location and a plurality of transportation requirement settings.

The invention provides a user device capable of providing a transportation service. The user device includes a communication unit, a storage unit and a processing unit. The communication unit is configured to transceive a transportation service request and a dispatch request. The storage unit is configured to store a plurality of modules. The processing unit is coupled to the communication unit and the storage unit, and when the user device is registered in a passenger identification, the processing unit accesses the plurality of modules to execute following steps. A service platform connecting with at least one community website is provided. A status message related to an event information and posted on the community website is collected, and the collected status message is displayed on the service platform. An event location of the event information is obtained. A transportation service link is built on the status message, where the transportation service link provides a transportation service interface indicating the event location and a plurality of transportation requirement settings.

The invention provides a server capable of providing a transportation service. The server includes a communication unit, a storage unit and a processing unit. The communication unit is configured to receive a transportation service request and send a dispatch request, where the transportation service request is sent through a user device by using a transportation service interface. The storage unit is configured to store a plurality of modules. The processing unit is coupled to the communication unit and the storage unit, and is configured to access the plurality of modules to execute following steps. A service platform connecting with at least one community website is provided. A status message related to an event information and posted on the community website is collected, and the collected status message is displayed on the service platform. An event location of the event information is obtained. A transportation service link is built on the status message, where the transportation service link provides the transportation service interface indicating the event location and a plurality of transportation requirement settings.

According to the above description, the invention provides a transportation services providing method and a user device and a server using the same. The transportation services providing method may provide a service platform displaying the status messages related to event information of each of the community websites, and the user device/the server obtains the event location in each of the status messages, and establishes a corresponding transportation service link on each of the status messages. The user may click the transportation service link to open the transportation service interface, and send a transportation service request though the transportation service interface preset with event location information. In this way, the user is unnecessary to manually check the event location, and unnecessary to additionally call a taxi, plan a transportation route, order tickets of transportation tools or seek for carpool, etc., which greatly improves user's convenience for using the transportation service.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a schematic diagram of a transportation service interface according to an embodiment of the invention.

FIG. 6 is a schematic diagram of a taxi service interface of the transportation service interface according to the embodiment of FIG. 5.

DESCRIPTION OF EMBODIMENTS

Figure 1:
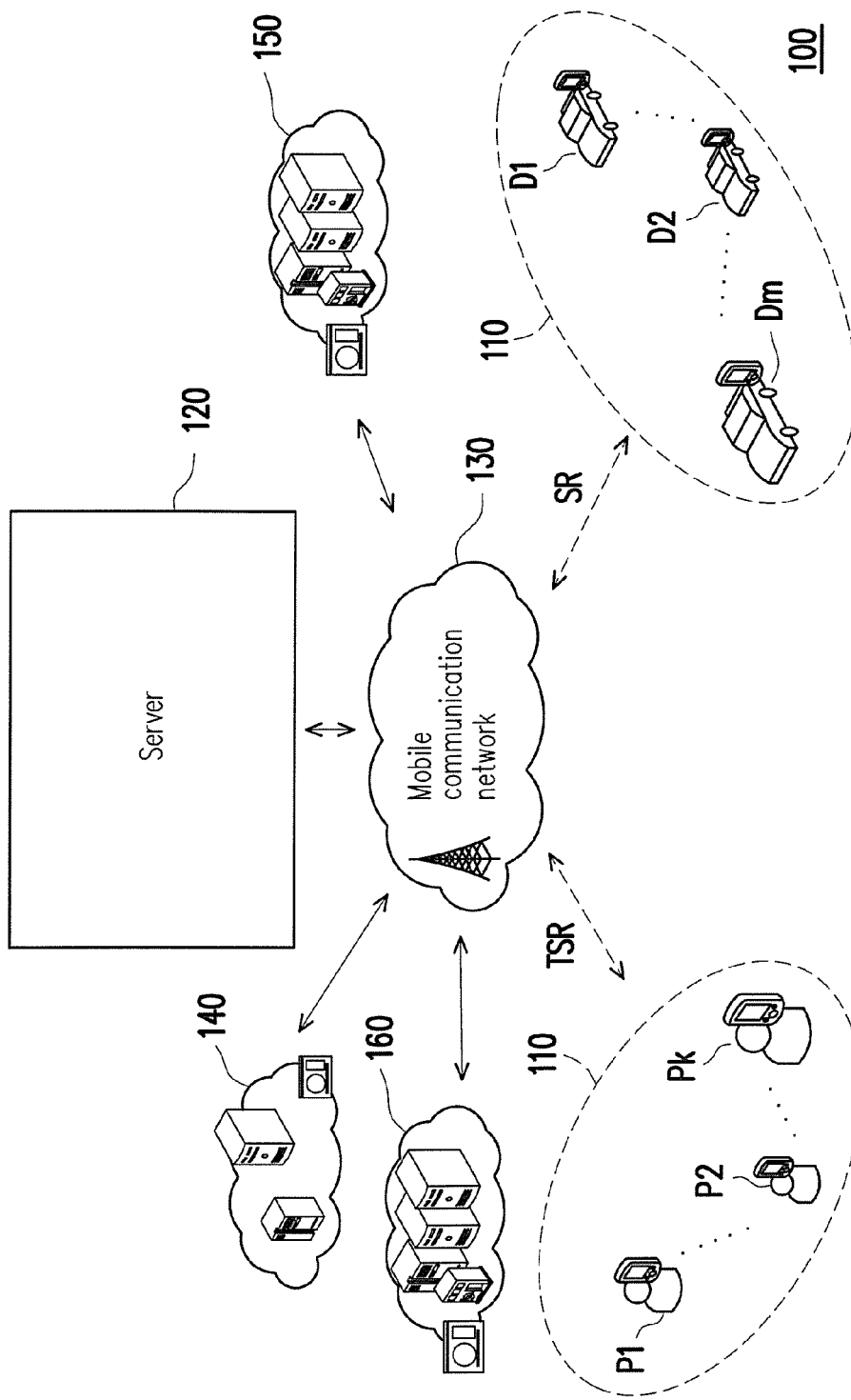
FIG. 1 is a schematic diagram of a transportation services providing system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a transportation services providing system according to an embodiment of the invention. In the transportation services providing system 100 of the present embodiment, user devices 110 and a server 120 may provide a service platform displaying status messages related to event information in each of community websites, and a user may view status messages related to the event participated by community contacts through the service platform, and may use a transportation service link built on the service platform to directly take a transportation service (including calling a taxi and planning a traffic rout) or send a carpool request.

Referring to FIG. 1, the transportation services providing system 100 includes the user devices 110, the server 120, a mobile communication network 130, a trade service server 140, a geographic information system server 150 and a community server 160.

In the present embodiment, the user devices 110 are, for example, home computers, notebooks, smart phones, tablet personal computers (PC), personal digital assistants (PDA), or other similar electronic devices, which are not limited by the invention. Moreover, according to different identifications of the device holders, the user devices 110 can be divided into user devices P1-Pk of a passenger end and user devices D1-Dm of a driver end (k and m are positive integers).

In an actual application, the identification of a device holder can be identified by registering on the service platform (though the invention is not limited thereto). For example, transportation request users (which are referred to as "passengers" below) intended to use the transportation service may resister on the service platform provided by the server 120 or the user devices P1-Pk, such that the server 120 may assign passenger identifications to the user devices P1-Pk of the passenger end. Similarly, transportation providing users (which are referred to as "drivers" below) intended to share seats or charge for a carrying service may also register on the server 120, and the server 120 may assign driver identifications to the user devices D1-Dm of the driver end.

For the sake of simplicity, the user device P1-Pk of the passenger end are referred to as "passenger end devices P1-Pk", and the user devices D1-Dm of the driver end are referred to as "driver end devices D1-Dm.

The server 120 can be connected to the user devices 110, the trade service server 140, the geographic information system server 150 and the community server 160 through the mobile communication network 130, and may access required information on the trade service server 140 and the geographic information system server 150 according to a transportation service request TSR sent by the passenger end devices P1-Pk, so as to generate a dispatch request SR to the driver end devices D1-Dm.

Figure 2:
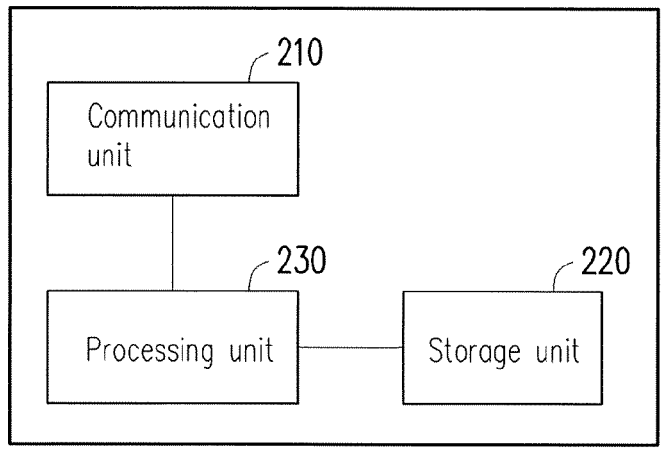
FIG. 2 is a schematic diagram of a user device and a server according to an embodiment of the invention.

In the present embodiment, a hardware configuration of the user devices 110 and the server 120 is shown in FIG. 2. Referring to FIG. 1 and FIG. 2, the user device 110 and the server 120 of the present embodiment respectively include a communication unit 210, a storage unit 220 and a processing unit 230. The communication unit 210 can be configured to connect the mobile communication network 120. For example, the communication unit 210 may establish a connection with a telecom platform for connecting the user device 110/the server 120 to the Internet. The mobile communication network 130 can be a network based on 2G, 3G, 3.5G, 4G or similar mobile communication technology. For example, the mobile communication network 130 can be configured based on a general packet radio service (GPRS), a code division multiple access (CDMA) technique, a high speed downlink packet access (HSDPA) technique or other similar mobile network techniques. In the present embodiment, the communication unit 210 is not limited to adopt a specific mobile network technique.

The storage unit 220 can be a fixed random access memory (RAM), a movable RAM, a read-only memory (ROM), a flash memory, a hard disk or other similar device or a combination thereof. The storage unit 220 may store a plurality of modules that can be executed by the processing unit 230. These modules can be loaded to the processing unit 230 to execute a transportation services providing method.

The processing unit 230 is a central processing unit (CPU), a genera purpose or special purpose programmable microprocessor, a digital signal processor (DSP), a programmable controller, an application specific integrated circuit (ASIC), a programmable logic device (PLD), or other similar device or a combination thereof. The processing unit 230 is coupled to the communication unit 210 and the storage unit 220. The respective processing unit 230 of the user device 110 and the server 120 may access and execute the modules stored in the storage unit 220 to implement the transportation services providing method of the invention, which is described later.

The trade service server 140 may charge the passenger using the transportation service, or pay to the driver who transports the passenger. The geographic information system server 150 may provide geographic information for the user devices 110 and the server 120 to access through the mobile communication network 130. The community server 160 may provide status messages of the community website and community contact information for the user devices 110 and the server 120 to access through the mobile communication network 130.

Figure 3:
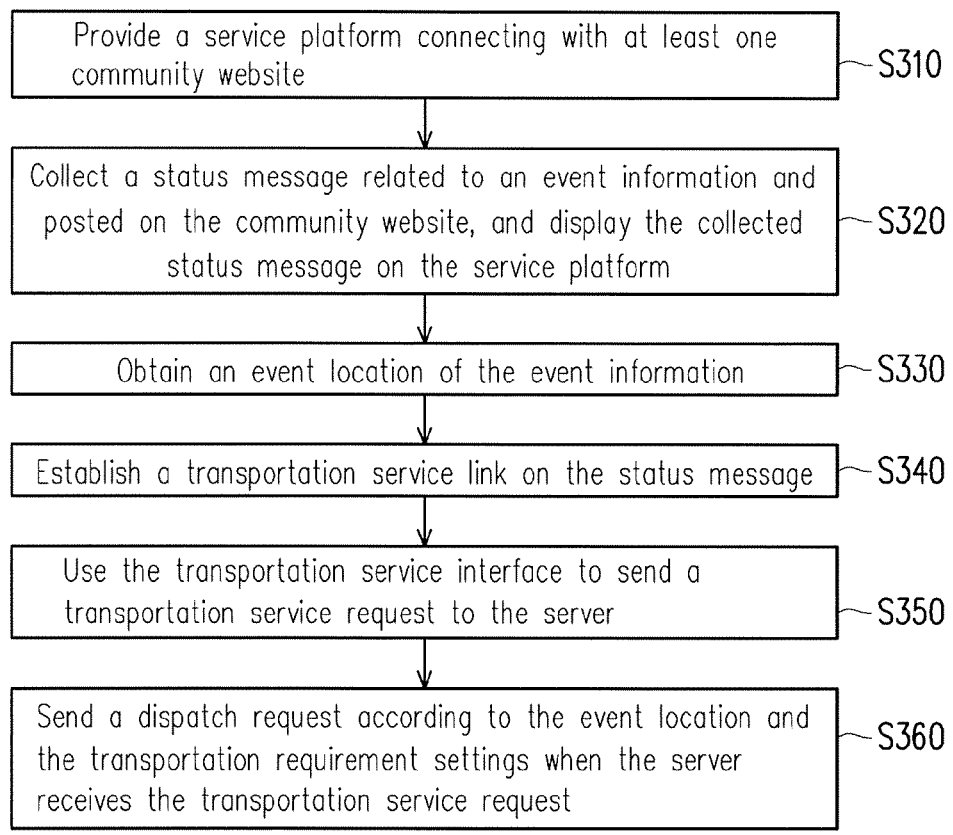
FIG. 3 is a flowchart illustrating a transportation services providing method according to an embodiment of the invention.

The transportation services providing method of the invention is described below with reference of a step flow of FIG. 3. Referring to FIG. 1 and FIG. 3, first, the passenger end devices P1-Pk or the server 120 provides a service platform connecting with at least one community website (step S310), where the passenger end devices P1-Pk/the server 120 collects a status message related to an event information and posted on the community website, and displays the collected status message on the service platform (step S320). The passenger end devices P1-Pk/the server 120 obtains an event location of the event information in the status message displayed on the service platform by accessing the geographic information system server 150 and the community server 160 (step S330). After the event location is obtained, the passenger end devices P1-Pk/the server 120 establishes a transportation service link on the status message displayed on the service platform (step S340), where the transportation service link provides a transportation service interface indicating the event location and a plurality of transportation requirement settings, and by inputting a specific transportation requirement setting in the transportation service interface, the passenger sends the corresponding transportation service request TSR to the server 120 (step S350), and when the server 120 receives the transportation service request, the server 120 sends the dispatch request SR to the driver end devices D1-Dm or transmits back transportation planning information to the passenger end devices P1-Pk according to the event location and the transportation requirement setting (step S360).

In detail, in the present embodiment, when the passenger wants to request the transportation service provided by the server 120, the passenger may operate a transportation service application program installed in the passenger end devices P1-Pk, so as to use an interface of the service platform provided by the transportation service application program to send the transportation service request TSR to the server 120. Alternatively, the passenger may operate the passenger end devices P1-Pk to connect the server 120 through the mobile communication network 130, so as to access the service platform of the transportation service from the server 110, and use the interface of the service platform to send the transportation service request TSR.

Figure 4:
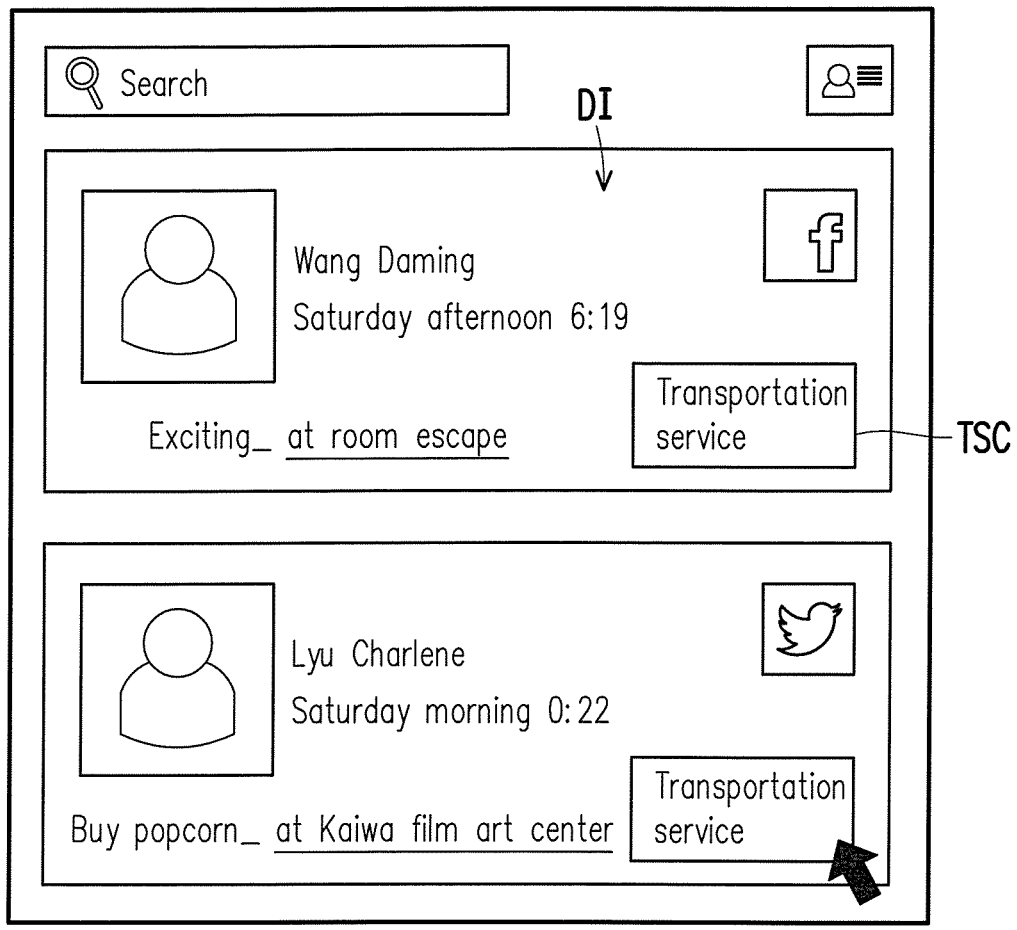
FIG. 4 is a schematic diagram of a service platform used for providing a transportation service according to an embodiment of the invention.

The interface of the service platform of the present embodiment is shown in FIG. 4. Referring to FIG. 4, in the interface of the service platform SP of the present embodiment, the status messages DI (for example, the status messages on facebook, twitter, etc.) related to the event information collected from different community websites are displayed. Similar to a status message presenting method in each of the community websites, the status message DI displayed in the interface of the service platform SP of the present embodiment may include names and avatars of the community contacts, release time of the status messages, content of the status messages and event information such as check-in location and event name, etc. (though a presenting method of the status message is not limited to that the manner shown in FIG. 4).

The transportation service link TSC is, for example, displayed at a lower right corner (the embodiment is not limited thereto) of each status message DI. After the passenger enters the service platform SP, the passenger may click the transportation service link TSC to open a transportation service interface TSI shown in FIG. 5.

Referring to FIG. 5, the transportation service interface TSI includes a destination field and a taxi service button and a transportation planning button. The server 120 may access information related to the event location from the geographic information system server 150 and the community server 160 according to the event information of the status message corresponding to the transportation service link TSC clicked by the passenger, and automatically fills the information of the event location in the destination field when the transportation service interface TSI is opened. Therefore, the passenger is unnecessary to additionally use an online map to check the event location, and manually input the address to the destination field.

Moreover, in the transportation service interface TSI, the passenger may click the taxi service button or the transportation planning button according to an actual requirement to open a taxi service interface or a transportation planning interface. When the passenger clicks the taxi service button, the passenger end device may further open a taxis service interface TSIc shown in FIG. 6, and when the passenger clicks the transportation planning button, the passenger end device may open a transportation planning interface TSIt shown in FIG. 7A.

Referring to FIG. 6 first, in the taxis service interface TSIc under the transportation service interface TSI, fields of transportation requirement settings such as a ride time field, a ride location field, a payment method field and a field of whether to agree a carpool are further displayed.

Regarding the ride time field and the ride location field, the taxis service interface TSIc may provide a predetermined ride time and a predetermined right location according to a current location of the passenger and the event information, and the passenger may manually modify the ride time field and the ride location field according to an actual requirement.

Moreover, the passenger may select the payment method and determine whether to agree the carpool according to an actual requirement, and presses an OK button to send the transportation service request TSR after confirming that all of the fields are filled.

From a point of view of the server 120, the server 120 may determine whether the transportation service request TSR sent by the passenger by using the transportation service interface TSI is received, and when the server 120 determines that the transportation service request TSR is received, the server 120 sends the dispatch request SR or transmits back transportation planning information according to a service type (the taxi service or the transportation planning) selected by the passenger and the content of each field in the taxi service interface TSIc.

In the application of the taxi service, when a driver (illustrated as a vehicle) wants to transport the passenger (i.e. share or provide a seat to the passenger), the driver may use the driver end devices D1-Dm to operate the transportation service application program to receive the dispatch request SR from the server 120 through the mobile communication network 130. When the driver end devices D1-Dm receive the dispatch request SR, the driver may determine whether to accept the dispatch request SR according to the ride location and ride time of the passenger, the destination and the transportation requirement such as whether to agree the carpool, etc.

If the driver agrees to accept the dispatch request SR, information resisted by the passenger such as the ride time, the ride location and the event location, etc., can be displayed on the driver end devices D1-Dm, and the driver can go to transport the passenger.

In an exemplary embodiment, the server 120 may determine a type of the dispatch request SR sent by the server 120 according to whether the passenger agrees the carpool. To be specific, the server 120 determines whether each of the passengers allows/agrees the carpool according to a carpool request setting of the transportation service request TSR received from different passenger end devices P1-Pk. If the server 120 determines that at least two or more passengers agree the carpool, the server 120 performs carpool pairing to the passengers agreeing the carpool. In the carpool pairing, the server 120 performs the pairing according to a ride location, a ride time and a destination of each of the passengers agreeing the carpool, so as to pair the passengers with the similar ride locations, ride time and destinations, and sends a corresponding carpool dispatch request to the driver end devices D1-Dm for transporting the paired passengers through a same dispatch vehicle.

Moreover, regarding the passengers not agreeing the carpool, the server 120 may send a separate dispatch request to the driver end devices D1-Dm, so as to separately transport the passengers not agreeing the carpool through the dispatch vehicles.

Figures 7A, 7B:
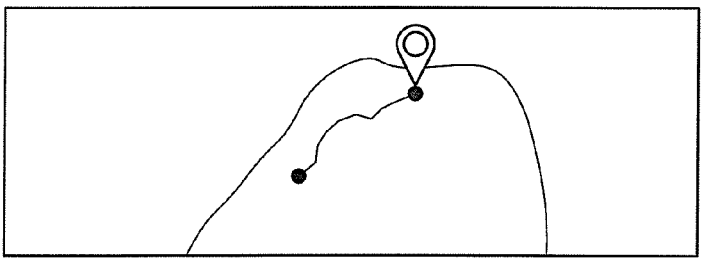
FIG. 7A and FIG. 7B are schematic diagrams of transportation planning interface of the transportation service interface according to the embodiment of FIG. 5.

Referring to FIG. 7A, in the transportation planning interface TSIt under the transportation service interface TSI, transportation setting fields such as a departure time field, a departure location field, and a vehicle type field, etc., are further displayed, where the vehicle type may include public transportation tools such as high-speed railway (HSR), mass rapid transit (MRT), train and bus for the passenger to select (though the invention is not limited thereto). The passenger may select the type of the public transportation tool to take according to an actual requirement, and press the OK button to send the transportation service request TSR after confirming that all of the fields are filled.

Similar to the embodiment of FIG. 6, from the point of view of the server 120, the server 120 may determine whether the transportation service request TSR sent by the passenger by using the transportation service interface TSI is received, and when the server 120 determines that the transportation service request TSR is received, the server 120 sends the dispatch request SR or transmits back transportation planning information according to a service type (the taxi service or the transportation planning) selected by the passenger and the content of each field in the transportation planning interface TSIt.

In the application of the transportation planning, the server 120 selects the transportation resources set by the passenger to perform transportation route planning based on a transportation planning setting. For example, if the passenger clicks the HSR, the MRT and the bus in the transportation planning interface TSIt, the server 120 may plan a transportation route according to a combination of the above three transportation tools. Moreover, the server 120 may obtain timetables of the selected transportation tools according to the planned transportation route. For example, if the server 120 plans a route of taking HSR-MRT, the server 120 further obtains the timetables of the HSR and the MRT according to the setting of the passenger. Then, the server 120 transmits back the planned transportation route and the obtained timetable information to the passenger end device, and the passenger end device displays a transportation planning information TSIti shown in FIG. 7B.

Referring to FIG. 7B, in the interface of the transportation planning information TSIti, a transportation route map indicating the departure location to the destination and timetables and transfer information of the combination of the transportation tools used in the recommended transportation routes are provided, for example, a route 1 shown in FIG. 7B: the HSR→MRT, and a route 2: bus→MRT. The passenger may click a button of "timetable" in the interface of the transportation planning information TSIti to check a timetable of the transportation tools on the corresponding transportation route, and click a button of "booking" to purchase/order tickets.

In this way, the user may implement transportation route planning and ticket purchase/order of the transportation tools through the service platform provided by the invention without additionally connecting a website of a specific transportation tool to purchase/order the ticket, by which operation convenience of the user is greatly improved.

Moreover, it should be noted that the transportation service interfaces TSI of the embodiments of FIG. 5 to FIG. 7B are only schematic examples, and the transportation service interface of the invention is not limited to be presented only according to the aforementioned manner.

In summary, the invention provides a transportation services providing method and a user device and a server using the same. The transportation services providing method may provide a service platform displaying the status messages related to the event information of each of the community websites, and the user device/the server obtains the event location in each of the status messages, and establishes a corresponding transportation service link on each of the status messages. The user may click the transportation service link to open the transportation service interface, and send a transportation service request though the transportation service interface preset with the event location information. In this way, the user is unnecessary to manually check the event location, and unnecessary to additionally call a taxi, plan a transportation route, order tickets of the transportation tools or seek for carpool, etc., which greatly improves user's convenience for using the transportation service.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A transportation services providing method, adapted to a first user device, a second user device, and a server, the transportation services providing method comprising:

assigning the first user device to a passenger identification by the server, and assigning the second user device to a driver identification by the server;

collecting a plurality of status messages of a plurality of community contacts from a plurality of community websites by the first user device, wherein only the status messages indicating an event location is collected;

providing a service platform and displaying only the collected status messages indicating the event location on the service platform by the first user device;

creating a transportation service link on each status message displayed on the service platform by the first user device;

in response to selecting the transportation service link on one of the status messages, providing a transportation service interface on the service platform by the first user device, wherein the transportation service interface comprises a first option and a second option, the first option is configured to send a first transportation service request for a public transit to the server, and the second option is configured to send a second transportation service request for a taxi service to the server;

when the first transportation service request is sent by the first option, displaying a recommended transportation route that only uses the public transit and providing an option configured to book a ticket of the public transit of the recommended transportation route on the service platform; and when the second transportation service request is sent by the second option, sending a dispatch request to the second user device by the server according to the event location of the status message corresponding to the selected transportation service link.

2. The transportation services providing method as claimed in claim 1, wherein the second transportation request comprises a carpool request setting.

3. The transportation services providing method as claimed in claim 2, wherein the step of sending the dispatch request to the second device by the server according to the event location of the status message corresponding to the selected transportation service link comprises:

determining whether a transportation request user of each first user device allows a carpool according to the carpool request settings of the second transportation service requests received from different first user devices;

performing a carpool pairing to the transportation request users allowing the carpool; and sending a carpool dispatch request according to a result of the carpool pairing, so as to transport the paired transportation request users by using a dispatch vehicle.

4. The transportation services providing method as claimed in claim 3, wherein the step of sending the dispatch request according to the status message corresponding to the selected transportation service link further comprises:

sending a separate dispatch request, so as to separately transport the transportation request user not allowing the carpool by using a dispatch vehicle.

5. The transportation services providing method as claimed in claim 1, wherein the first transportation service request comprises at least one required public transportation setting, the step of displaying the recommended transportation route that only uses the public transit and providing an option configured to book the ticket of the used public transit of the recommended transportation route on the service platform comprises:

planning a transportation route using at least one of the at least one required public transportation tool by the server;

obtaining timetable information of the at least one public transportation tool used in the transportation route; and providing a timetable button and a booking button for the transportation route, wherein the timetable button is configured to display the timetable information of the at least one public transportation tool used in the transportation route, and the booking button is configured to purchase or order a ticket of the at least one public transportation tool used in the transportation route.

6. A user device capable of providing a transportation service, comprising:

a communication unit;

a storage unit, configured to store a plurality of modules; and a processing unit, coupled to the communication unit and the storage unit, wherein when the user device is assigned a passenger identification by a server, the processing unit accesses the modules to execute following steps:

collecting a plurality of status messages of a plurality of community contacts from a plurality of community websites, wherein only the status messages indicating an event location is collected;

providing a service platform and displaying only the collected status messages indicating the event location on the service platform;

creating a transportation service link on each status message displayed on the service platform;

in response to selecting the transportation service link on one of the status messages, providing a transportation service interface on the service platform, wherein the transportation service interface comprises a first option and a second option, the first option is configured to send a first transportation service request for a public transit to the server, and the second option is configured to send a second transportation service request for a taxi service to the server; and when the first transportation service request is sent by the first option, displaying a recommended transportation route that only uses the public transit and providing an option configured to book a ticket of the public transit of the recommended transportation route on the service platform, wherein when the second transportation service request is sent by the second option, the server sends a dispatch request to another user device assigned a driver identification according to the event location of the status message corresponding to the selected transportation service link.

7. The user device capable of providing the transportation service as claimed in claim 6, wherein the second transportation service request comprises a carpool request setting.

8. The user device capable of providing the transportation service as claimed in claim 6, wherein when the user device is assigned a driver identification by the server, the processing unit accesses the modules to execute following steps:

receiving the dispatch request through the communication unit;

determining whether to accept the dispatch request; and displaying a ride time, a ride location and an event location on the user device when accepting the dispatch request.

9. A server capable of providing a transportation service, comprising:

a communication unit, configured to receive a transportation service request and send a dispatch request, wherein the transportation service request is sent through a user device by using a transportation service interface;

a storage unit, configured to store a plurality of modules; and a processing unit, coupled to the communication unit and the storage unit, and configured to access the modules to execute following steps:

assigning a first user device to a passenger identification, and assigning a second user device to a driver identification;

collecting a plurality of status messages of a plurality of community contacts from a plurality of community websites, wherein only the status messages indicating an event location is collected;

providing a service platform and displaying only the collected status messages indicating the event location on the service platform;

in response to selecting the transportation service link on one of the status messages, providing a transportation service interface on the service platform, wherein the transportation service interface comprises a first option and a second option, the first option is configured to send a first transportation service request for a public transit, and the second option is configured to send a second transportation service request for a taxi service;

when the first transportation service request is received by the first option or received from the first user device through the communication unit, displaying a recommended transportation route that only uses the public transit and providing an option configured to book a ticket of the public transit of the recommended transportation route on the service platform; and when the second transportation service request is received by the second option or received from the first user device through the communication unit, sending a dispatch request to the second user device according to the event location of the status message corresponding to the selected transportation service link.

10. The server capable of providing the transportation service as claimed in claim 9, wherein the second transportation service request comprises a carpool request setting.

11. The server capable of providing the transportation service as claimed in claim 10, wherein the processing unit determines whether a transportation request user of each first user device allows a carpool according to the carpool request settings of the first transportation service requests received from different first user devices, and performs a carpool pairing to the transportation request users allowing the carpool, and sends a carpool dispatch request according to a result of the carpool pairing, so as to transport the paired transportation request users by using a dispatch vehicle.

12. The server capable of providing the transportation service as claimed in claim 11, wherein the processing unit further sends a separate dispatch request through the communication unit, so as to separately transport the transportation request user not allowing the carpool by using a dispatch vehicle.

13. The server capable of providing the transportation service as claimed in claim 9, wherein the first transportation service request comprises at least one required public transportation tool, wherein the processing unit plans a transportation route using at least one of the at least one required public transportation tool, obtains timetable information of the at least one transportation tool used in the transportation route, and provides a timetable button and a booking button for the transportation route, wherein the timetable button is configured to display the timetable information of the at least one public transportation tool used in the transportation route, and the booking button is configured to purchase or order a ticket of the at least one public transportation tool used in the transportation route, wherein when the first transportation service request is received from the first user device, the processing unit further transmits back the timetable information and the transportation route to the first user device through the communication unit.

* * * * *